Figure 1:
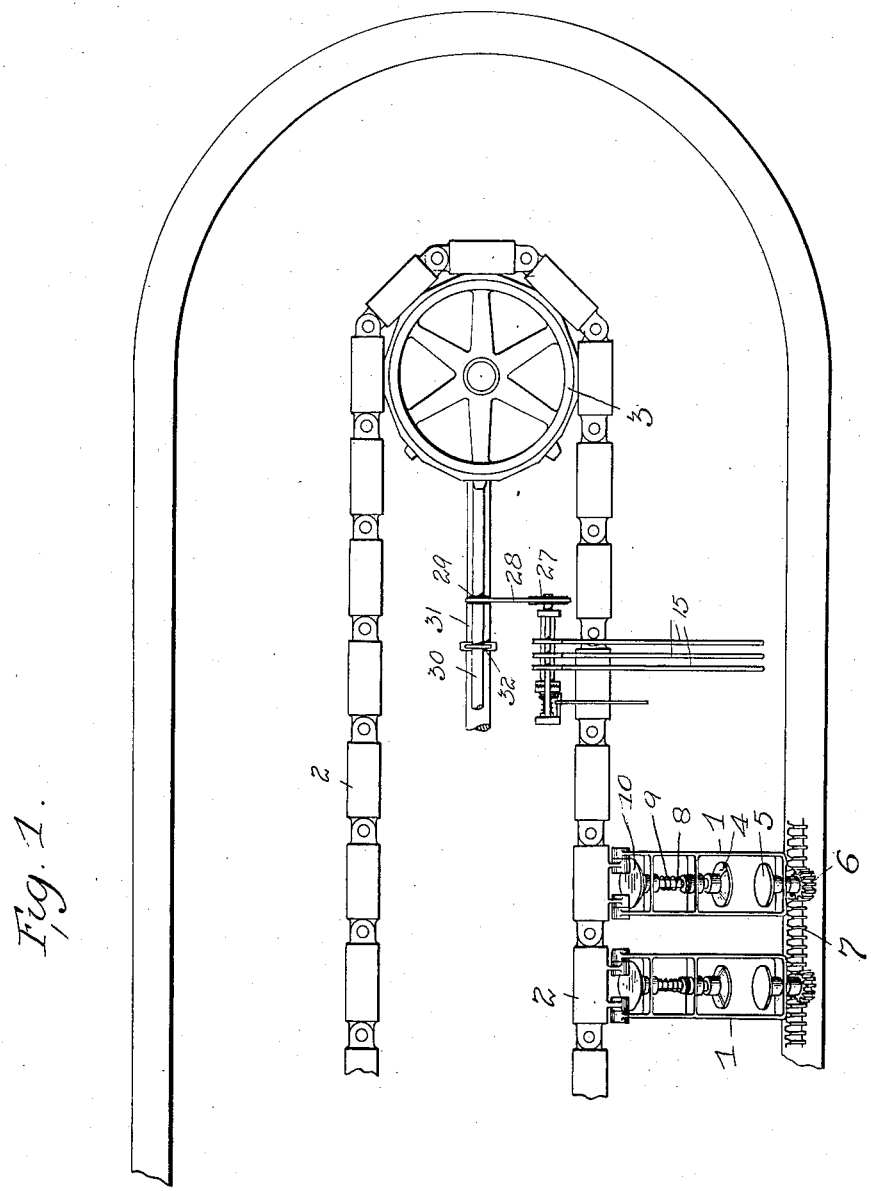

No. 894,236. PATENTED JULY 28, 1908.
H. K. SMITH.
SOLDER FEEDING MECHANISM.
APPLICATION FILED JUNE 19, 1907.

2 SHEETS—SHEET 1.

Attest:
Beatrice G. Phillips.
Edward N. Sartor

Inventor
Harry K. Smith.
by Spear, Middleton, Donaldson & Spear
Attys.

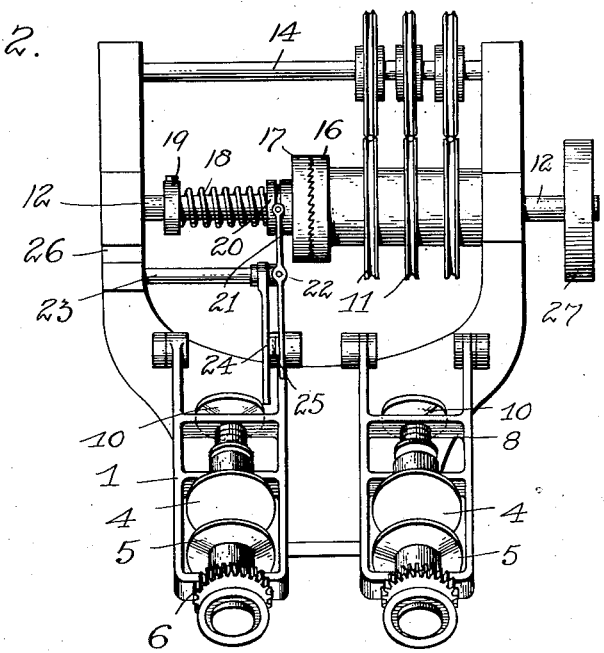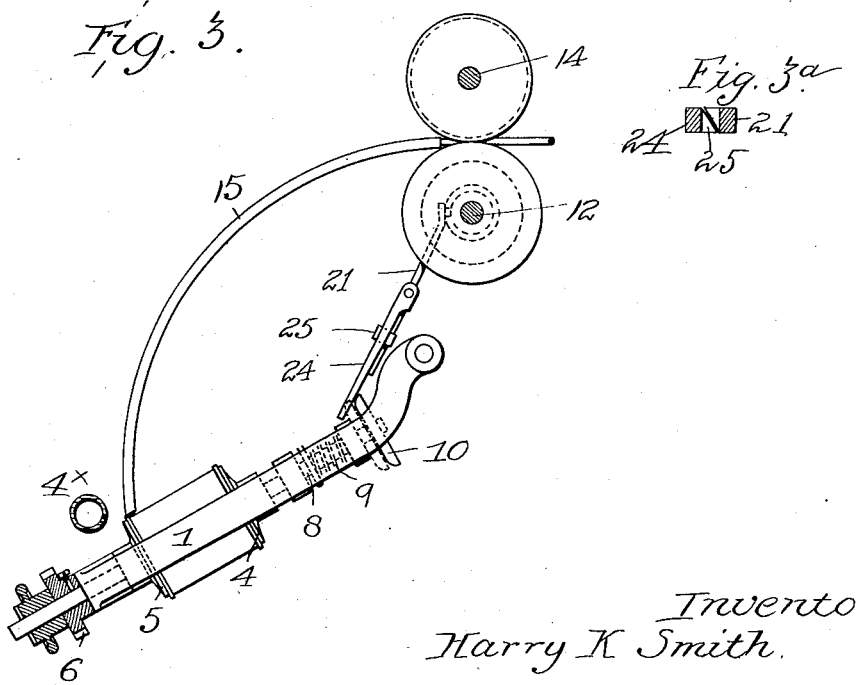

UNITED STATES PATENT OFFICE.

HARRY KING SMITH, OF BALTIMORE, MARYLAND, ASSIGNOR TO FEDERAL CAN COMPANY OF CAROLINE COUNTY, OF FEDERALSBURG, MARYLAND, A CORPORATION OF MARYLAND.

SOLDER-FEEDING MECHANISM.

No. 894,236.　　　Specification of Letters Patent.　　　Patented July 28, 1908.

Application filed June 19, 1907. Serial No. 379,790.

*To all whom it may concern:*

Be it known that I, HARRY KING SMITH, citizen of the United States, residing at Baltimore, Maryland, have invented certain new and useful Improvements in Solder-Feeding Mechanism, of which the following is a specification.

My invention relates to can soldering machines and is an improvement upon the type of machines disclosed in Letters Patent of the United States granted to me July 9, 1907, #859,851. In this machine the cans are carried in holders which are caused to traverse the machine by means of an endless chain, this traversing movement carrying the cans in succession past the solder applying devices so that solder is directed to the end seam. In the said application the solder feeding devices were normally stationary and were operated by the traversing movement of the can or its holder. The solder feeding devices in said application included means for feeding forward the solder wire, means for cutting definite lengths of said solder wire, means for holding these said lengths when cut and tripping means whereby the cut lengths of solder were released from the holding means to be directed upon the end seam of the cans. In the arrangement referred to the feeding forward of the solder, the cutting thereof and the operation of the tripping device whereby the cut length is discharged or directed upon the seam were all controlled by the traversing movement of the can or of the holder therefor.

In my present improvement I aim to simplify the solder feeding mechanism, and while insuring a positive feed and the deposition of exact and definite quantities of solder upon the seam my purpose is to reduce the expense of manufacture and avoid unnecessary operation and combination of parts. In carrying out my invention therefore, I provide means for feeding the solder continuously, the said means being timed in its movement so as to feed forward exact and definite lengths of the solder wire for each can. In a machine of this character in which the cans are held in a series of holders arranged at definite distances apart and which distances are the same for all of the cans, it is possible by timing the operation of the solder feeding devices to employ a continuous feed for the solder instead of an intermittent feed, as the cans arrive at the solder station at regular and predetermined intervals and the character of the machine is such that the holder can always be supplied with cans and thus there will be a can at the soldering point for each feeding movement of the solder wire.

The invention consists in the combination and arrangement of parts hereinafter described and particularly pointed out in the claims.

In the accompanying drawings, Figure 1 is a plan view of so much of the can soldering machine as is necessary to a clear understanding of my invention. Fig. 2 is a front view of the solder feeding appliances, and Fig. 3 is a detail view looking from the right of Fig. 2. Fig. 3ª is a detail sectional view across the levers 24, 21.

In these drawings 1 indicates a series of can holders carried by an endless chain 2, which passes around wheels at the ends of the machine, one of which is shown at 3. The can holders comprise frames carrying clamping disks 4, 5. The disk 5 has a pinion 6 on its shaft, meshing with a rack 7 which extends entirely around the machine and by which the cans are rotated. The clamping disk 4 is on a stem 8 pressed by a spring 9 to move the clamping disk 4 to hold the can between itself and the disk 5; the said stem 8 having also a wheel or button 10 thereon by which the clamp 4 is retracted to allow the can to enter between the clamping disks all as described in the application referred to.

The chain 2 is driven continuously and at a uniform rate of speed and consequently the can holders arrive at the soldering point at regular intervals. The solder feeding mechanism at this point is adapted to be driven continuously so as to feed forward during these regular intervals just the proper amount of solder wire for the soldering of the end seam. The solder feeding mechanism comprises a feed wheel 11 loose on a shaft 12, a knurled pressure wheel on a shaft 14 and a tube 15 extending from these wheels to the end seam to be soldered. The feed wheel 11 has a clutch member 16 combined therewith, which coöperates with a clutch member 17 splined upon the shaft 12 and pressed normally into engagement with the clutch wheel 16 by a spring 18 pressing against the clutch member 17 at one end and upon the collar 19 fixed to the shaft 12. The clutch 17 is provided with a grooved extension 20 which is engaged by a clutch lever 21 pivoted at 22 to a suitable bracket 23 to which is also pivoted a controlling lever 24, the end of which extends down adjacent the path of the button or wheel 10 fixed on the spindle or stem of the clamping disk 4. This controlling lever has a cam portion or incline 25 Fig. 3ª thereon adapted to work against a similar portion of the clutch lever 21. The purpose of these parts will be hereinafter referred to.

The shaft 12 has its bearings in the frame 26 which may be supported from the main frame work in any suitable manner and this shaft carries a sprocket wheel 27 receiving movement from a chain 28 which passes around a sprocket wheel 29 on a shaft 30 to which power is transmitted from the main shaft 31 of the machine through the sprocket chain and wheels indicated generally at 32 all of which are generally indicated in Fig. 1. By this power transmitting connection the solder feed mechanism is operated continuously and in a certain relation as to speed, to the movement of the main carrier chain and the can holders carried thereby. It will therefore be seen that during the intervals between arrival of the cans at the solder feeding tube 15 the solder wire will be fed forward through this tube, the exact amount predetermined upon as necessary for soldering the seam, and when the heated can, which is heated by burners in the ordinary way arrives at the solder feeding tube the projected part of the solder wire will be in position to contact to the desired degree with the heated can and just the exact quantity of solder will be melted off from the end thereof to be sweated into the seam. It will be understood that a plurality of these solder feeding tubes may be employed at each station, there being a like number of solder feed wheels such as that shown at 11, upon the shaft 12 so that the solder at each station may be applied by a series of contacts between the can and the ends of the solder wires, and of course these contacts will be disposed at different points circumferentially of the end seam.

As described in the application above referred to the cans are fed to the machine through a chute and enter the clamps in succession as they pass the end of the chute. Of course it is only necessary to keep the chute supplied with cans to insure that each holder on the machine will receive its can to be carried to the continuously operating solder feeding mechanism. Should, however, for any cause, a holder be empty the attendant could, by operating the clutch lever 21 by hand, throw the solder feeding mechanism out of operation until the empty holder passed on, when upon releasing the clutch lever the solder feeding mechanism would operate continuously again. I have, however, provided means whereby the stopping of the solder feeding mechanism will be effected automatically should an empty holder arrive at the solder station and for this purpose the controlling lever above described is employed, having its end extending into proximity to the path of the wheel or disk 10 of the clamping disk. It will be observed that when the can is in place between the clamping disks the stem 8 will be pressed back against the pressure of its spring 9 and thus the disk or button 10 will pass by the end of the controlling lever 24 without operating the same. Should, however, a can be absent from between the clamping disks the spring 9 would move the disk 4 closer to the disk 5 and consequently the button or wheel 10 instead of lying in the position shown in Fig. 3 relatively to the holder would assume the position indicated in dotted lines in said figure and thus it would describe a path which would bring it against the end of the controlling lever 24 so as to actuate this and cause the incline 25 thereon to act against the incline on the clutch lever 21 and operate the said clutch automatically to stop the feeding of the solder while the empty can holder is passing the solder feeding tube, and after the said button or wheel 10 gets past the end of the controlling lever the operation of the solder feeding mechanism will be resumed.

I do not of course, limit myself to a machine in which the carrier is in the form of a chain, nor do I limit myself to a particular form of holding mechanism or the precise form of solder feeding mechanism.

The features to which my invention are confined are particularly brought out in the following claims:

At 4ˣ Fig. 3, I indicate a burner tube for heating the cans, this being of any well known form and arrangement.

I claim as my invention:—

1. In a can soldering machine, continuously operating solder feeding mechanism arranged at a fixed station in relation to the moving cans and means for presenting the cans thereto at regular intervals to contact with the solder wire at said station, said solder feeding mechanism having movement timed in relation to the movement of the can carrying mechanism, substantially as described.

2. In combination in a soldering machine, a carrier having a series of can holding devices thereon for carrying the cans spaced apart at regular intervals and continuously operating solder feeding mechanism having a movement timed in relation to the movement of the can carrier mechanism, said solder feeding mechanism being arranged at a fixed station in relation to the movement of the can and delivering the solder directly against the can at said fixed station, substantially as described.

3. In combination in a can soldering machine, a continuously operating carrier, can holding means carried thereby and continuously operating solder feeding mechanism having its movement timed in relation to the movement of the carrier to feed definite and exact lengths of solder forward during the interval of the arrival of the cans said solder feeding mechanism being arranged at a fixed station in relation to the movement of the can and delivering the solder directly against the can at said fixed station, substantially as described.

4. In combination in a can soldering machine, a carrier, holders for the cans on the said carrier, solder feeding mechanism normally operating continuously and timed in its movement in relation to the movement of the carrier to feed definite exact lengths of solder during the intervals of the arrival of the can holders, means whereby the solder feeding mechanism may be thrown out of operation temporarily, said solder feeding mechanism being arranged at a fixed station in relation to the movement of the can and delivering the solder directly against the can at said fixed station, substantially as described.

5. In combination in a can soldering machine, a carrier, holders for the cans on the said carrier, solder feeding mechanism at a fixed station and normally operating continuously and timed in its movement in relation to the movement of the carrier to feed definite and exact lengths of solder during the intervals of the arrival of the can holders, the solder as continuously fed contacting directly with the can at said station, and means whereby the solder feeding mechanism may be automatically thrown out of operation temporarily, substantially as described.

6. In combination in a can soldering machine, a carrier, a series of can holders arranged thereon, solder feeding mechanism normally operating continuously and means operating automatically when a can is absent from the holder for throwing the normally continuously operating solder feeding mechanism out of operation, substantially as described.

7. In combination in a can soldering machine, a carrier, a series of holders thereon comprising the clamping disks arranged to be spread apart when a can is in place between them and moved toward each other when no can is present, solder feeding mechanism operating normally continuously and in time with the movement of the machine to feed definite lengths of solder forward during the intervals of the arrival of the can holders and means controlled by the position of the clamps for throwing the soldering mechanism out of operation, substantially as described.

8. In combination in a can soldering machine, a carrier, a series of holders thereon comprising the clamping disks arranged to be spread apart when a can is in place between them and moved toward each other when no can is present, solder feeding mechanism operating normally continuously and in time with the movement of the machine to feed definite lengths of solder forward during the intervals of the arrival of the can holders and means controlled by the position of the clamps for throwing the soldering mechanism out of operation, said means consisting of the wheel or button 10 connected with one of the clamps, and the clutch mechanism controlled thereby, substantially as described.

9. In combination in a can soldering machine, means for giving the can a traveling movement to pass the solder station at regular intervals, and solder feeding means fixed at the solder station and normally in continuous operation and timed relatively to the traveling movement of the cans, substantially as described.

10. In combination in a can soldering machine, means for giving the can a traveling movement to pass the solder station and solder feeding means arranged at said station and operating continuously to feed the solder to contact with the passing can, substantially as described.

11. In combination in a can soldering machine, solder feeding mechanism normally operating continuously, means for feeding the cans past the solder feeding mechanism, said means being adapted to hold the cans at definite distances apart, and means operating automatically when a can is absent from its proper place in the feeding means for throwing the normally continuously operating solder feeding mechanism out of operation, substantially as described.

In testimony whereof, I affix my signature in presence of two witnesses.

HARRY KING SMITH.

Witnesses:
   HENRY E. COOPER,
   A. M. TANNER.